(12) United States Patent
Sprangle (10) Patent No.: US 8,605,099 B2
(45) Date of Patent: Dec. 10, 2013

(54) PARTITION-FREE MULTI-SOCKET MEMORY SYSTEM ARCHITECTURE

(75) Inventor: Eric Sprangle, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1353 days.

(21) Appl. No.: 12/059,193

(22) Filed: Mar. 31, 2008

(65) Prior Publication Data

US 2009/0248990 A1    Oct. 1, 2009

(51) Int. Cl.
*G06F 13/00* (2006.01)
(52) U.S. Cl.
USPC .............. 345/536; 345/419; 345/532; 712/22
(58) Field of Classification Search
USPC .............. 345/532, 536, 419; 711/154; 712/22
See application file for complete search history.

(56) References Cited

U.S. PATENT DOCUMENTS

| | | | |
|---|---|---|---|
| 4,495,567 A | | 1/1985 | Treen |
| 5,212,777 A | | 5/1993 | Gove et al. |
| 5,956,744 A | * | 9/1999 | Robertson et al. ............ 711/122 |
| 6,070,003 A | * | 5/2000 | Gove et al. ..................... 710/317 |
| 6,092,156 A | | 7/2000 | Schibinger et al. |
| 6,212,598 B1 | * | 4/2001 | Jeddeloh ......................... 711/105 |
| 6,219,765 B1 | * | 4/2001 | Jeddeloh ......................... 711/154 |
| 6,363,460 B1 | | 3/2002 | Jeddeloh |
| 6,717,834 B2 | * | 4/2004 | Zagorianakos et al. ......... 365/63 |
| 6,862,027 B2 | * | 3/2005 | Andrews et al. ............... 345/505 |
| 7,047,341 B2 | | 5/2006 | Jung |
| 7,159,066 B2 | * | 1/2007 | Dodd ................................. 711/5 |
| 7,165,161 B2 | * | 1/2007 | Parthasarathy et al. ........ 711/170 |
| 7,962,724 B1 | * | 6/2011 | Ali ................................. 712/207 |
| 2003/0126383 A1 | * | 7/2003 | Cho et al. ....................... 711/154 |
| 2003/0167379 A1 | * | 9/2003 | Soltis, Jr. ....................... 711/119 |
| 2004/0054957 A1 | * | 3/2004 | Luetkemeyer ................. 714/794 |
| 2005/0022065 A1 | * | 1/2005 | Dixon et al. ..................... 714/42 |
| 2005/0071581 A1 | * | 3/2005 | Dodd ............................... 711/154 |
| 2005/0204113 A1 | * | 9/2005 | Harper et al. .................. 711/170 |
| 2006/0090059 A1 | * | 4/2006 | Huang ............................ 711/209 |
| 2009/0150624 A1 | * | 6/2009 | Resnick ......................... 711/155 |

FOREIGN PATENT DOCUMENTS

| | | |
|---|---|---|
| JP | 64-36363 A | 2/1989 |
| JP | 2002-132741 | 5/2002 |
| JP | 2005-522758 A | 7/2005 |
| JP | 2006-526224 A | 11/2006 |
| WO | 03/085516 A1 | 10/2003 |
| WO | 2004/107184 A2 | 12/2004 |

OTHER PUBLICATIONS

Office Action received for Korean Patent Application No. 10-2009-27790, mailed on Dec. 20, 2010, 4 pages of English translation.
Office Action received for German Patent Application No. 10 2009 016 471.5 , mailed on May 7, 2010, 6 pages of German Office Action including 3 pages of English translation.

(Continued)

*Primary Examiner* — Maurice L McDowell, Jr.
(74) *Attorney, Agent, or Firm* — Trop, Pruner & Hu, P.C.

(57) ABSTRACT

A technique to increase memory bandwidth for throughput applications. In one embodiment, memory bandwidth can be increased, particularly for throughput applications, without increasing interconnect trace or pin count by pipelining pages between one or more memory storage areas on half cycles of a memory access clock.

30 Claims, 11 Drawing Sheets

(56) References Cited

OTHER PUBLICATIONS

Office Action received for Japanese Patent Application No. 2009-083082, mailed on Feb. 21, 2012, 3 pages of Japanese Office Action and 3 pages of English translation.

Japanese Patent Office, Office Action mailed Jan. 29, 2013 in Japanese application No. 2009-083082.

* cited by examiner

PARTITION-FREE MULTI-SOCKET MEMORY SYSTEM ARCHITECTURE

FIELD OF THE INVENTION

Embodiments of the invention relate generally to the field of information processing and more specifically, to the field of multi-socket memory interfaces.

BACKGROUND

As more applications, continue to take advantage of the parallel processing capabilities of multi-processing systems and microprocessors, there is a growing need to facilitate greater memory bandwidth. Parallel applications can include graphics applications, financial applications, medical and biotechnological applications, or any other application that involves operating on large sets of data concurrently, via, for example, single-instruction multiple-data (SIMD) instructions. To some extent, more traditional, sequential central processing unit (CPU) workloads, may also require or otherwise benefit from greater memory bandwidth and data bus sizes, depending on the size of the data structures on which they operate.

Graphics applications, for example, tend to perform texturing operations or other effects on many pixels of a polygon or polygons in parallel to render a three-dimensional (3D) graphics scene. The size of some textures, or other large data structures, may require, or otherwise create a need for, high bandwidth from one or more processors to one or more memory storage areas (e.g., DRAM) to retrieve and store this data quickly. Some prior art techniques have attempted to provide greater memory bandwidth by increasing the number of pins or bus traces from one or more processors or processing cores to one or more memories. Increasing interconnect widths, such as the off-package bus width, to increase bandwidth can adversely affect system cost and can constrain the applicability of the system to more general purpose computing systems.

In some prior art techniques, increasing memory bandwidth can be done by increasing the bandwidth (vis-à-vis increasing switching frequency) of each data pin and/or adding more data pins to the package. However, there are practical (e.g., economic) limits to increasing bandwidth through increasing bus width (e.g., by adding more pins) and/or increasing bus frequency.

To further increase system bandwidth, some prior art techniques may use multiple processors with a corresponding memory allocated to each processor. This creates a pairing between the processors and the allocated memory, which are typically interconnected by a high bandwidth bus. Processor/memory pairs may then be connected to each other by another bus, which may require additional pins, but may not have the bandwidth to support sharing of data fetched by each processor from its corresponding memory. Because of the difficulty in sharing information accessed by one processor from one memory to another processor in an expedient manner, applications may attempt to partition work performed by the application between the processor/memory pairs. Partitioning an application can present a significant burden to application developers, as they need to make sure they are storing and accessing data within the proper processor/memory pair to avoid significant latency. Placing constraints on applications, like code/data partitioning, can increases application development costs, inhibits portability, and prevent these applications from being more successful in the marketplace.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Embodiments of the invention relate to processing devices and systems, including those that may process parallel or "throughput" applications. Some embodiments include at least two processing units (e.g., graphics processors) to process memory accesses on behalf of applications, such as 3D graphics applications, and at least two storage structures, such as DRAM devices, each coupled to the at least two processing units, wherein each of the at least two storage structures includes or has associated therewith one or more buffers to store information having a storage width corresponding to the width of data to be read from each memory (e.g., 16 bits). In one embodiment, each buffer is partitioned, configurable in width, or otherwise coupled to the two different processors (via their respective memory controllers, for example), where one portion of each buffer (e.g., half) is to store data to be provided to one processor and other portions (e.g., half) are coupled to at least one other processor, such that each processor can access information from each memory concurrently. In one embodiment, the number of portions of the buffers is configurable based on the number of processors accessing data from them.

By providing each processor access to two or more storage structures, application software can store and access information in and from more than one storage structure, which provides flexibility to software on where program data and other information is stored and accessed. Moreover, embodiments of the invention not only allow software to access information from other memory structures other than the one corresponding to a particular processor, but embodiments of the invention do so while maximizing each processor's memory interface bandwidth.

Embodiments of the invention enable software applications to access and store information in multiple storage structures corresponding to multiple processors. This may be helpful, in some instances, when processing parallel instructions or applications that make use of single-instruction-multiple-data (SIMD) or multiple-instruction-multiple-data (MIMD) operations, because each SIMD or MIMD operation can access operand data elements from multiple memory structures, without regard to the particular memory structure in which they're located. This may be particularly helpful for applications, such as 3D graphics or financial applications that can perform operations on large pieces of information concurrently. However, it may also be helpful for some traditional, more sequential, CPU applications, as well that make use of information that may be stored in a number of different locations.

In some embodiments, where memories are organized or accessed according to segments, such as "pages", the processors (or memory interface logic) that access the pages may maintain structures (e.g., "page tables") to map a particular memory structure's page size or organization into the processor's or memory controller's paging size or scheme. For example, in one embodiment, in which a processor or memory controller may map a particular memory's physical pages onto a set number of virtual pages, which the processor or memory controller may open and close in response to a program accessing the pages.

Because in some embodiments, each processor or memory interface may access other memory structures, which may be controlled by or otherwise correspond to another processor memory interface, some communication between the processors/memory controllers may be desirable in order to maintain coherency between the page states (open/close) of each processor or memory controller. In one embodiment, an n-wide interconnect (where 'n' may indicate a variable number of channels/pins/lanes/traces, from 1 to more) may be used to communicate page state between the various processors or memory controllers, such that one processor doesn't close a page of memory that another processor may need to access. By communicating page state between the various processors or memory controllers accessing one or more memories, unnecessary page open or close operations may be avoided, thereby improving access performance between the various processors or memory controllers. Moreover, in some embodiments, the n-wide interconnect may be of a relatively low bandwidth, so as not to require undue pins, power, or other resources.

Advantageously, embodiments of the invention may allow an application to run on multiple processors without regard to the memory device in which data is stored or is to be stored. This is particularly useful in graphics applications where, for example, one graphics processor is rendering half of the screen of pixels and another graphics processor is rendering the other half. In this situation, triangles that fall on the boundary may cause latency when filtered, as one processor will need to access adjacent texil information (corresponding to texils on the corresponding processor's half of the screen) from one memory and another processor will need to access adjacent texil information (corresponding to texils on the corresponding processor's half of the screen) from another memory. In this situation, a processor needing information from a non-corresponding memory may need to request it through the corresponding processor, which will have to return it to the requesting processor, which consumes bandwidth requiring a relatively high-bandwidth bus between the processors. Otherwise, software developers would have to make restrictions on where data is stored, which would be quite difficult, particularly in the event of rendering cross-border triangles.

A similar situation exists where one processor is to render a frame and another processor is to render the next frame. Particularly, effects, such as reflection, sometimes rely on information from the frame immediately preceding it. In this case, the same latency problem as when dealing with split frames (described above) can exist as information is needed in a current frame (corresponding to one processor/memory pair) from a prior frame (corresponding to another processor/memory pair). Embodiments of the invention may handle situations, such as the split-frame rendering example and the alternating frame rendering example, without the bandwidth problems of some prior art techniques and without the software knowing or caring where the corresponding data is stored. This is possible, in one embodiment, due to the fact that processors used in some embodiments of the invention automatically (without help from the OS or application) store information (such as a page of information) in an alternating fashion between the memories being used, and derive information from an address provided, from which memory to access the data.

In one embodiment, a page table maps an address provided by software onto locations in two memories corresponding to two processors used for performing throughput applications. Particularly, the page table uses bits of an address to access entries of the table, which contain addresses of information stored in alternating locations within the two memories. Therefore, when software stores or accesses the information the page table automatically routes the access to the appropriate memory without the requesting software (OS or application) understanding or caring about where the information is actually stored. In this way, information can be accessed at burst speeds from either memory in an alternating fashion, thereby maximizing the bandwidth of each processor's memory interface and avoiding a relatively high-bandwidth bus to support cross-memory/processor accesses.

In some embodiments, multiple processors may provide data to a requesting application by managing the request in an efficient way, such as by using a coherency filter. In one embodiment, a coherency filter may include one or more coherency tables or other structure corresponding to and accessible by one or more processors, such that a request for data by an application running on one processor may cause that processor to access a table indicating address of data that may be currently accessible by another processor (e.g., vis-à-vis in the processor's cache, buffer, or other structure, in a page currently open in the processor's corresponding memory, etc.). If the most recent version of the requested data resides in the other processor's cache, the processor receiving the request may signal the other processor to return the requested data to the requesting application, or the processor receiving the request may retrieve the data from the processor over the n-wide inter-processor interconnect. In some embodiments, each processor may include multiple processors, in which case each processor may correspond to a processor socket.

In some embodiments, the above described techniques may be applied to processors or systems having two, four, eight, or more processors or cores. Furthermore, embodiments of the invention may be applied to a number of different system or processing configurations or applications, including general purpose computers, graphics game consoles, graphics card applications, etc. In one embodiment, techniques described herein involve one or more processors to run 3D graphics or other applications, such as financial applications, medical applications, imaging applications, etc. In other embodiments, techniques described herein may be used in conjunction with general purpose CPU's for running sequential or more traditional workloads. In still other embodiments, techniques described herein may be used in conjunction with hybrid processors designed to run both traditional CPU workloads and throughput applications, such as processors including traditional CPU and graphics-specific logic ("CPU+GPU"). In one embodiment, techniques described herein are used in conjunction with one or more processors having a number of CPU processor cores, able to perform SIMD instructions, coupled to an interconnect along with parallel-application specific logic, such as graphics texture sampling logic.

Figure 1:
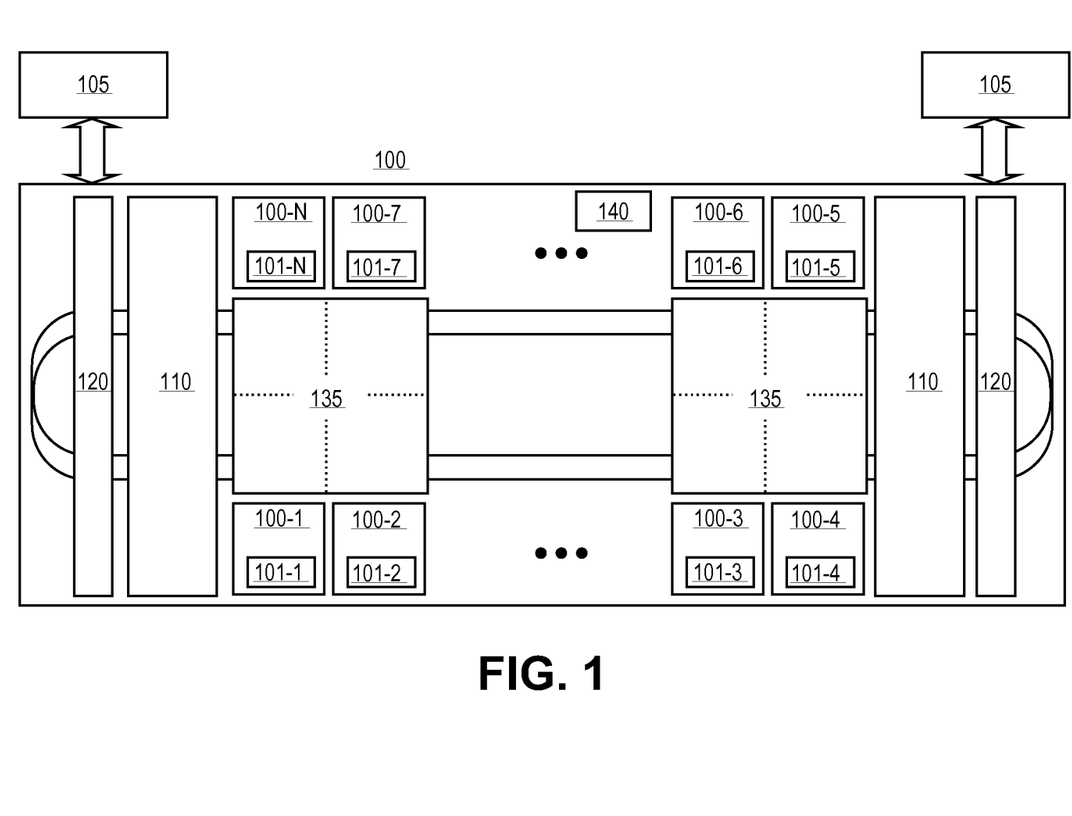
FIG. 1 illustrates a block diagram of a multi-processor system, in which at least one embodiment of the invention may be used.

FIG. 1 illustrates a microprocessor in which at least one embodiment of the invention may be used. FIG. 1 illustrates a processor that may be used for traditional CPU applications, throughput applications (e.g., 3D graphics applications) or a combination of traditional CPU and throughput applications. Processor 100 includes a number of processing cores 100-1 through 100-N, dedicated throughput application hardware 110 (e.g., graphics texture sampling hardware), memory interface logic 120, organized along a ring interconnect 130. In some embodiments, the processor 100 may include one or more last-level caches 135 that is inclusive of information from caches 101-1 through 101-N within each core 100-1 through 100-N. In one embodiment, one or more processing cores 100-1 through 100-N is able to perform SIMD operations.

In one embodiment, the memory controller may interface memory located outside of the processor 100, which may include DRAM, such as graphics DRAM 105. In one embodiment, the memory interface may have a certain width, such as 16 bits, and may access memory pages of a certain size, such as 2 KB. In systems where more than one processor 100 may access one or more memories, such as DRAM, controlled by or otherwise corresponding another processor or memory controller, processor 100 may also include logic 140 to communicate, receive, and process information to or from a different processor or memory controller in order to maintain page state coherency between the various processors accessing the various memories. In one embodiment, logic 140 may include a register or other storage area along with some control or decode logic in conjunction with a page table to interpret the page state of other processors or memory controllers that may access the same memory as the processor 100. Processor 100 may use this coherency information to decide whether to close a page of memory or open a new page of memory. Moreover, processor 100 may communicate the state of certain pages of memory to other processors or memory controllers accessing the same memory as processor 100.

In some embodiments, information, such as graphics textures, or other information requiring a relatively large amount of memory bandwidth, may be accessed from other memory corresponding to another processor (not shown), without application software being aware or concerned about the memory in which the information is stored. In one embodiment, the memory interface of the system may compound its effective bandwidth by providing addresses to at least two memory storage structures, such as a DRAM or an array of DRAM (e.g., DIMM), and supplying a first portion of data width from a first memory to a processor concurrently with supplying a second portion of data width from the first memory to a second processor, while a first portion of a data width of a second memory to the first processor and a second portion of the data width of the second memory to the second processor.

Figure 2:
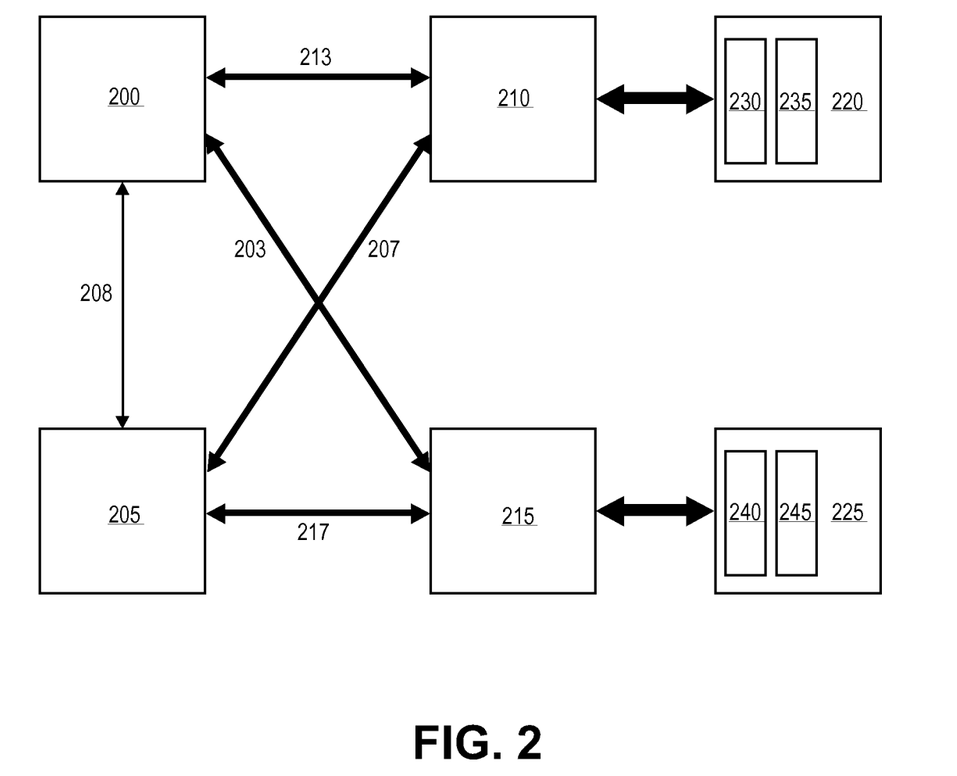
FIG. 2 is a block diagram illustrating a dual socket system, in which the memory controllers are external to their respective processors, according to one embodiment.

In some embodiments, processor 100 may include more or fewer memory controllers than illustrated in FIG. 1. Moreover, the memory controllers of FIG. 1 may be internal to the processor 100 or external to the processor 100. FIG. 2, for example, is a block diagram illustrating a dual socket system, in which the memory controllers are external to their respective processors, according to one embodiment.

In particular, FIG. 2 illustrates a processor 200 and 205 coupled to corresponding memory controllers 210 and 215, which control memories 220 and 225 respectively. As indicated in FIG. 2, processor 200 and 205 each communicate with memory controllers 210 and 215 over interconnects 203, 207, 213, and 217. Moreover, processors 200 and 205 communicate page state information over link, 208. In one embodiment, addresses are provided to memories 220 and 225, and in response thereto, a data word is read out of each memory from the locations addressed into one or more buffers 230, 235, 240, 245 within the memory, outside of the memory, or within the memory controllers. In one embodiment, the data word is 16 bits, but could be other sizes, depending on the width of processor/memory controller/memory databus. In one embodiment, the one or more buffers are organized into two portions (e.g., halves), such that processor 200 may read one half of one of the buffers 230, 235 corresponding to memory controller 210 concurrently with processor 200 reading one half of one of the buffers 240, 245 corresponding to memory controller 215, while processor 205 reads the other half of one of the buffers 230, 235 corresponding to memory controller 210 and the other half of the one of the buffers 240, 245 corresponding to memory controller 215.

In one embodiment, the buffers may be configurable to be partitioned into a number of portions corresponding to a number of processors that may be accessing the memory to which the buffers correspond. For example, the buffers may be configurable to partition into halves in a dual-processor system, fourths in a quad-processor system, eighths in an octal-processor system, etc. In one embodiment, logic may be used to detect the number of processors accessing the memory in the system and to automatically (dynamically) partition the buffers in response thereto.

After one of the two buffers corresponding to each memory controller is read, the second buffer for each of the memory controllers may be immediately read in a similar fashion on the next clock edge, in one embodiment, while the next data word is read from the memories into the previously read buffer corresponding to one of the memory controllers 210 and 215. This process may continue for an indefinite number of cycles, such that data may be continuously read from (or written to) both memories by into processors 200 and 205 at each cycle or each half-cycle (in the case of double-pumped interfaces). In one embodiment, a number of pages in each memory may remain open at once, such that a new page close/open cycle need not be performed for each access. However, if a new page does need to be opened, one of the processors may inform the other of the page to be opened or a page to be closed via link 208, so that a page is not closed, for example, that is being used by one of the processors. In this way, the two processors' page state can remain coherent.

Figure 3:
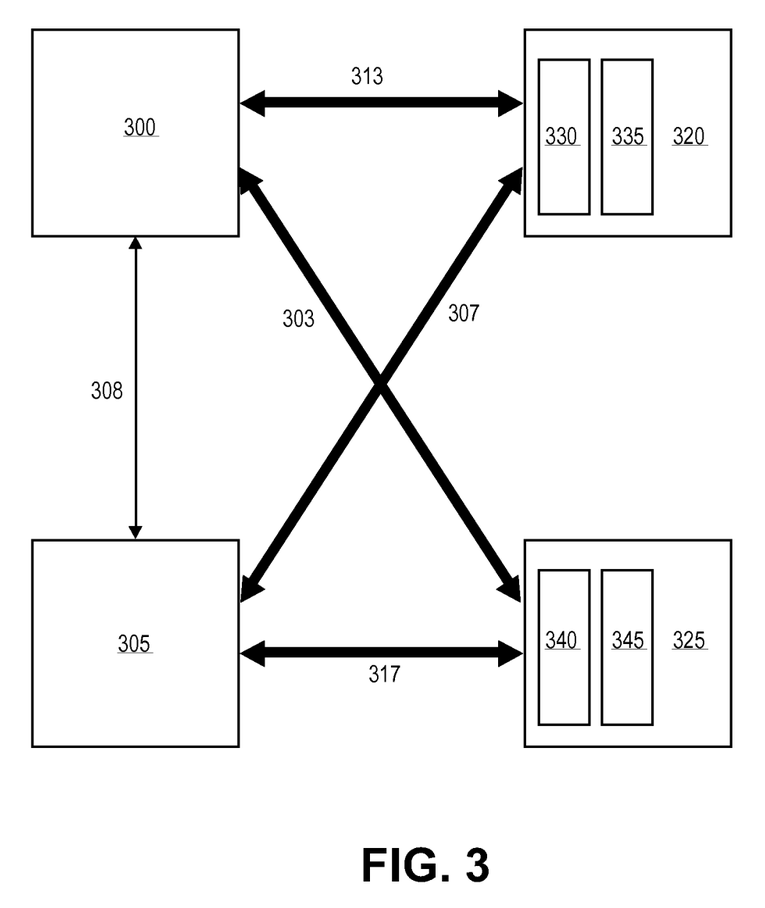
FIG. 3 is a block diagram illustrating a dual socket system, in which the memory controllers are internal to their respective processors, according to one embodiment.

The memory controllers 210 and 215 may be internal to processors 200 and 205, in one embodiment. FIG. 3 is a block diagram illustrating a dual socket system, in which the memory controllers are internal to their respective processors 300 and 305, according to one embodiment. In one embodiment, buffers 330, 335, 340, and 345 are located either within memories 320 and 325 or outside of the memories, such as on a DIMM circuit board. In one embodiment, information may be written to or read from memories 320 and 325 in a manner consistent with the techniques described in reference to FIG. 2.

Figure 4:
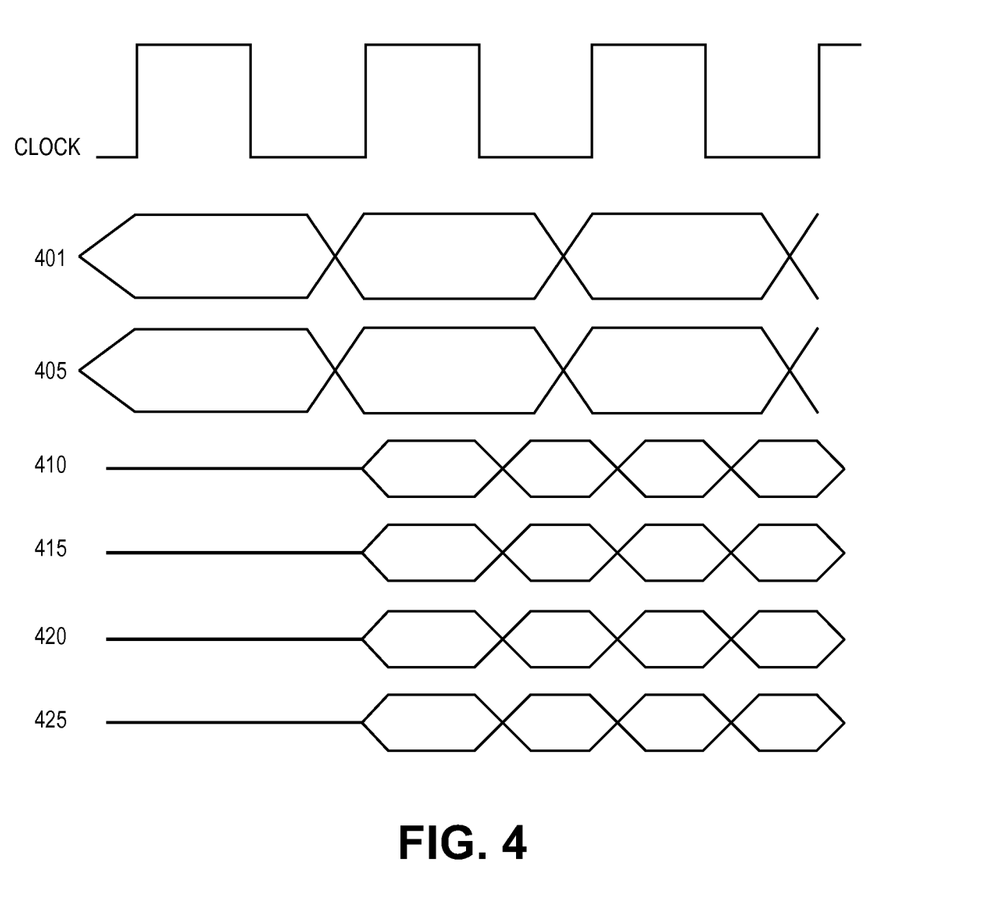
FIG. 4 illustrates a timing diagram corresponding to the dual socket system of FIGS. 2 and 3, according to one embodiment.

FIG. 4 illustrates a timing diagram associated with FIG. 2 or FIG. 3, according to which at least one embodiment may be performed. According to one embodiment, FIG. 4 illustrates address 401, 405 and data signals 410, 415, 420, 425, corresponding to data halves communicated from each memory to each processor illustrated in FIGS. 2 and 3. As is evident from FIG. 4 is the fact that embodiments of invention may facilitate data to be read on each half clock cycle, or in some embodiments, each clock cycle.

Figure 5:
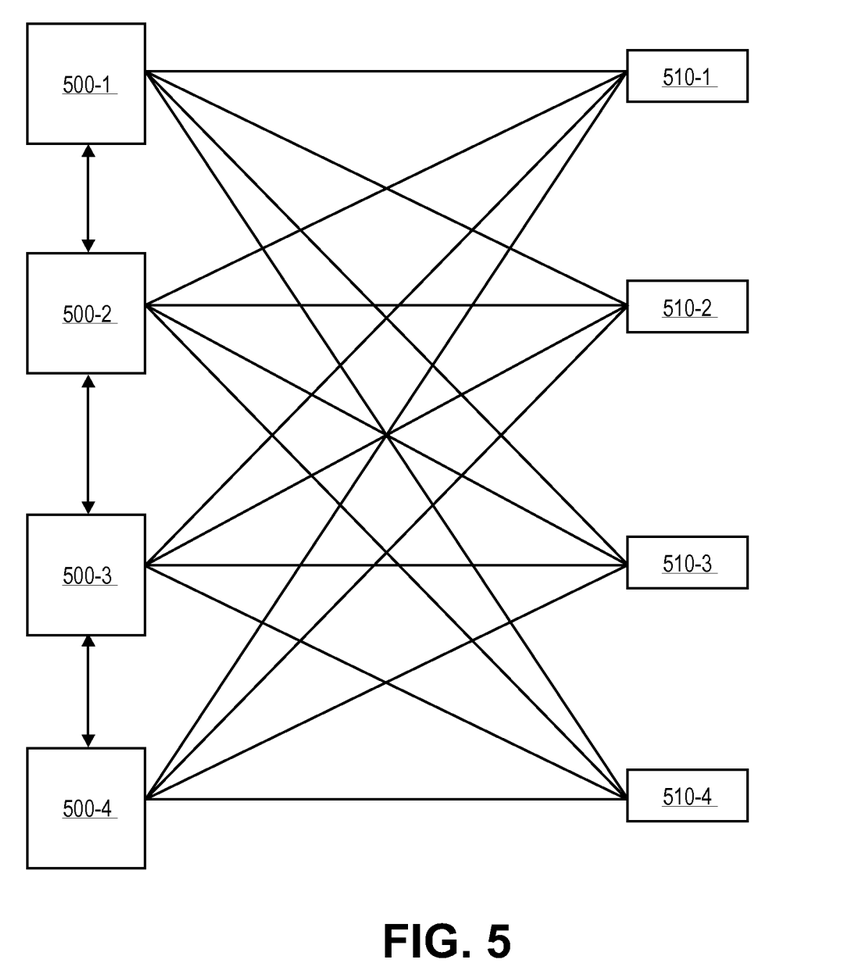
FIG. 5 is a block diagram illustrating a quad-socket system, according one embodiment.

The techniques illustrated in the timing diagram of FIG. 4 may be expanded to accommodate more than two processors reading from two different memories. FIG. 5 illustrates a quad-socket system, in which at least one embodiment of the invention may be performed. In the quad-socket system of FIG. 5, any processor 500-1 through 500-4 may read from any memory 510-1 through 510-4 concurrently, such that a software application need not be concerned about where the data is located.

Figure 6:
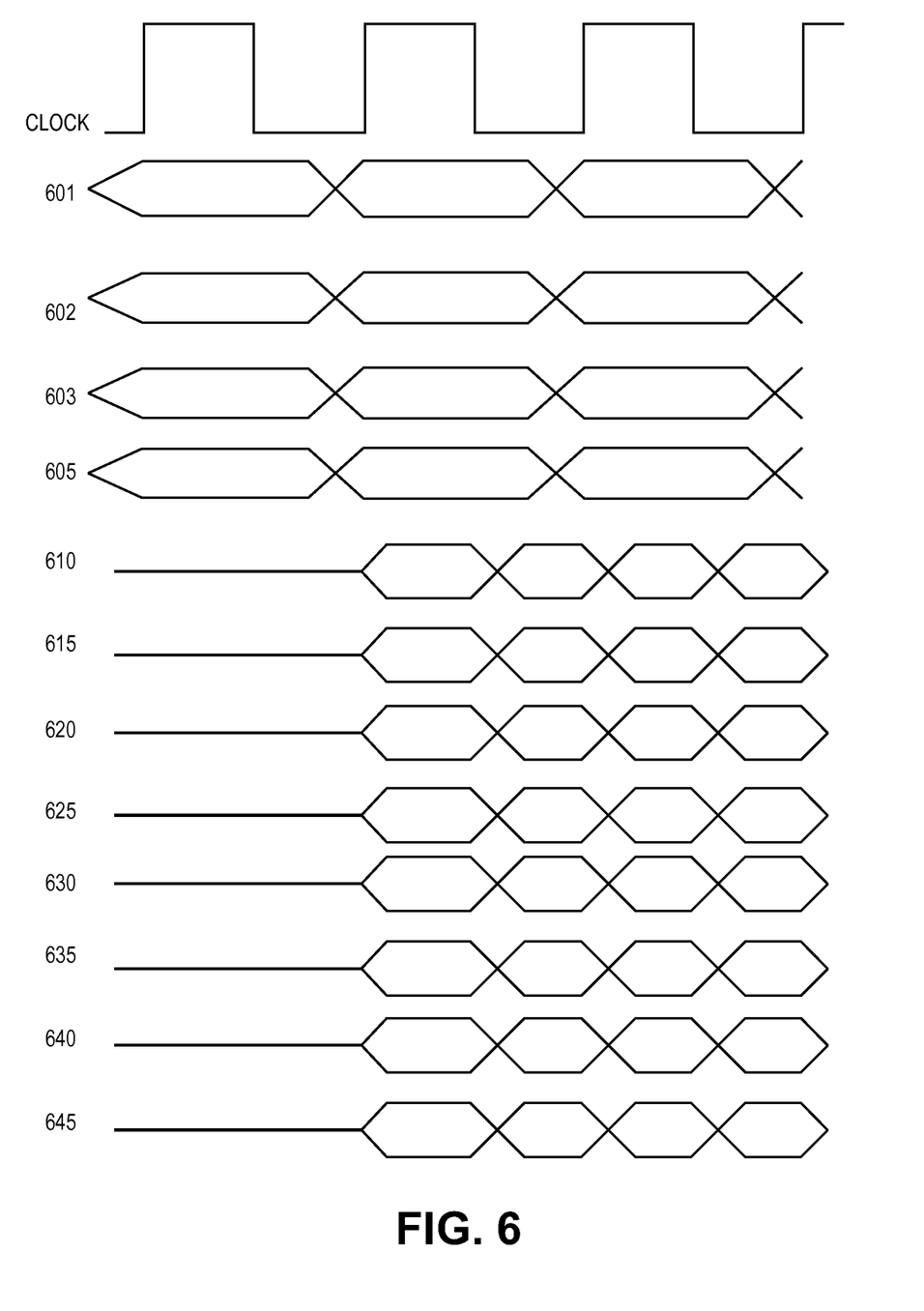
FIG. 6 illustrates a timing diagram corresponding to the quad-socket system of FIG. 5, according to one embodiment.

FIG. 6 illustrates a timing diagram corresponding to the quad-socket system of FIG. 5, according to one embodiment. According to one embodiment, FIG. 6 illustrates address 601, 602, 603, 605 and data signals 610, 615, 620, 625, 630, 635, 640, 645 corresponding to data halves communicated from each memory to each processor illustrated in FIG. 5. As is evident from FIG. 6, is the fact that embodiments of invention may facilitate data to be read on each half clock cycle, or in some embodiments, each clock cycle.

Figure 7:
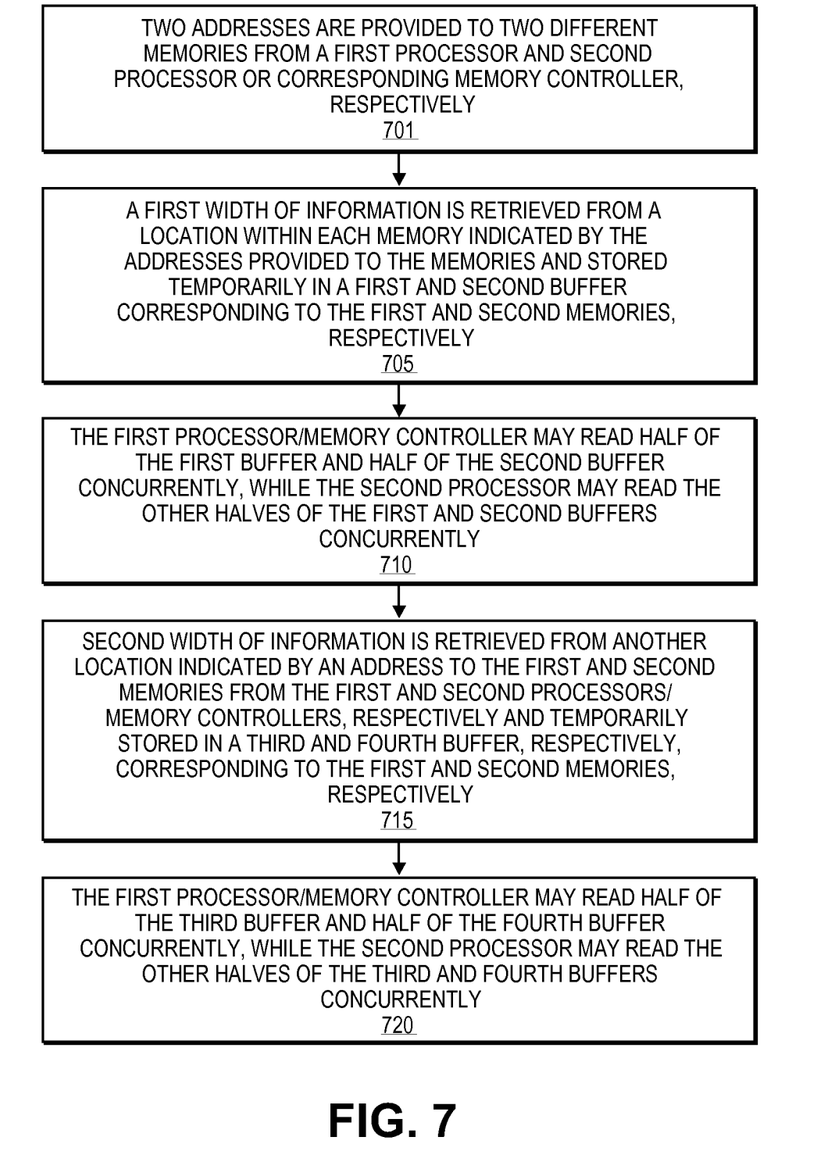
FIG. 7 is a flow diagram of operations that may be used for performing at least one embodiment of the invention.

FIG. 7 is a flow diagram of operations that may be used for performing at least one embodiment of the invention. In one embodiment, two addresses are provided to two different memories (e.g., cache, DRAM, etc.) from a first processor and second processor or corresponding memory controller, respectively at operation 701. A first width of information is retrieved from a location within each memory indicated by the addresses provided to the memories and stored temporarily in a first and second buffer corresponding to the first and second memories, respectively at operation 705. At this point, the first processor/memory controller may read half of the first buffer and half of the second buffer concurrently, while the second processor may read the other halves of the first and second buffers concurrently at operation 710. At operation 715, while the processors are reading data from the first and second buffers, second width of information is retrieved from another location indicated by an address to the first and second memories from the first and second processors/memory controllers, respectively and temporarily stored in a third and fourth buffer, respectively, corresponding to the first and second memories, respectively. The first processor/memory controller may read half of the third buffer and half of the fourth buffer concurrently, while the second processor may read the other halves of the third and fourth buffers concurrently at operation 720.

The operations may be repeated in succession for an entire page length of data, or in some embodiments, longer, where subsequent pages can be opened without effecting the access rate of the read operations. Moreover, in some embodiments, there may be fewer or more than two buffers corresponding to each of the two different memories. In one embodiment, the first and second widths of data are each 16 bits. However, in other embodiments, they may be larger or smaller. Also, in some embodiments, the operations described above may be extended to four, eight, or any number of processors or memory devices. In one embodiment, each processor is a graphics processor, but in some embodiments all or some of the processors may be general purpose processors or some combination of general purpose and graphics processors. Operations described above can be used, in one embodiment, to improve performance of throughput applications, such as graphics applications, financial applications, molecular modeling applications, or other applications that involve performing operations/instructions on a number of data elements concurrently.

Embodiments of the invention may be used on various platforms in various configurations, including gaming consoles and general purpose computer platforms. Moreover, processors and memories used in conjunction with various embodiments may be organized in a number of ways, depending on the needs and constraints of the particular system or application.

Figure 8:
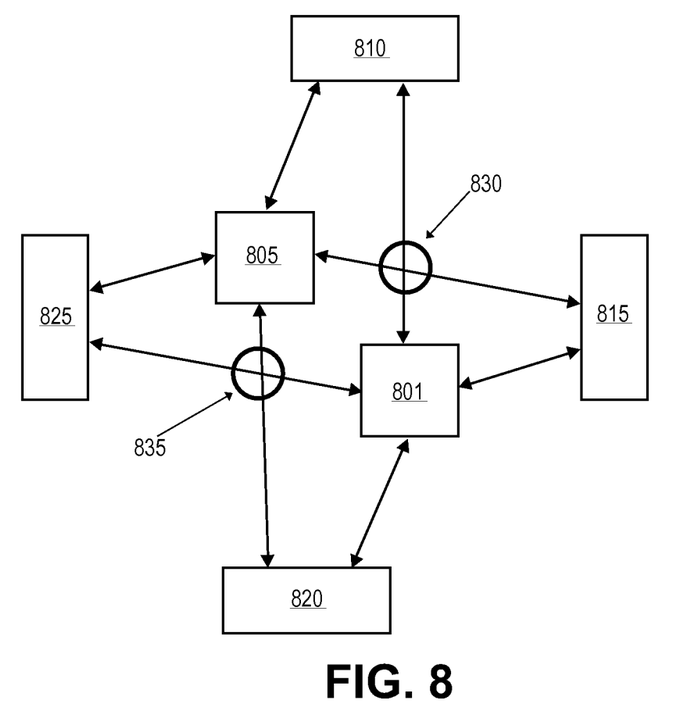
FIG. 8 is a block diagram illustrating a configuration of a dual socket system, in which at least one embodiment may be used.

FIG. 8 is a block diagram illustrating a configuration of a dual socket system, in which at least one embodiment may be used. FIG. 8 illustrates processors 801 and 805 being coupled to memories 810, 815, 820, and 825. The configuration of FIG. 8 may involve routing crossing interconnects 830 835 in multiple layers of a circuit board, which may be acceptable or desirable in some applications.

Figure 9:
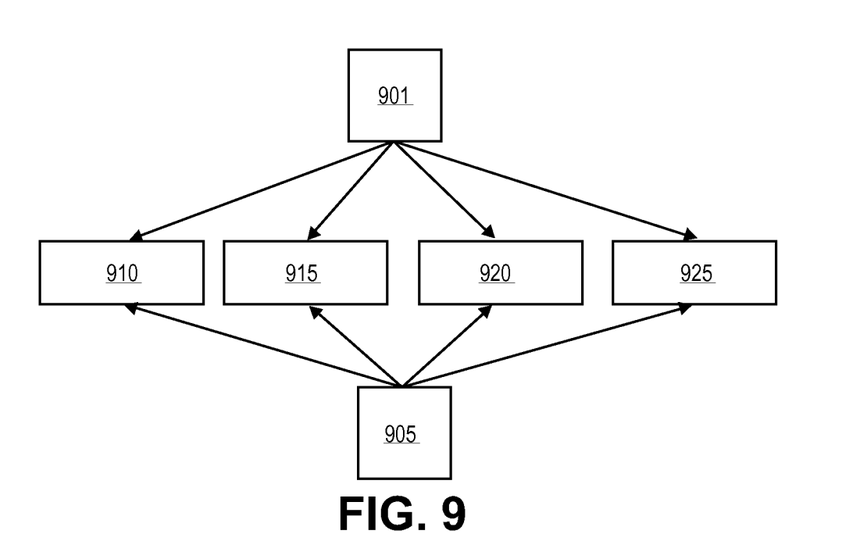
FIG. 9 is a block diagram illustrating another configuration of a dual socket system, in which at least one embodiment may be used.

FIG. 9 is a block diagram illustrating another configuration of a dual socket system, in which at least one embodiment may be used. FIG. 9 illustrates two processors 901, 905 coupled to four memories 910, 915, 920, 925. The configuration illustrated in FIG. 9 may not involve routing interconnects in multiple layers, since there are no crossing interconnects. Other configurations may be used, depending on the needs of the platform or application. Moreover, embodiments of the invention may be used in a number of different systems, having a number of different interconnect topographies, organizations, protocols, etc.

Figure 10:
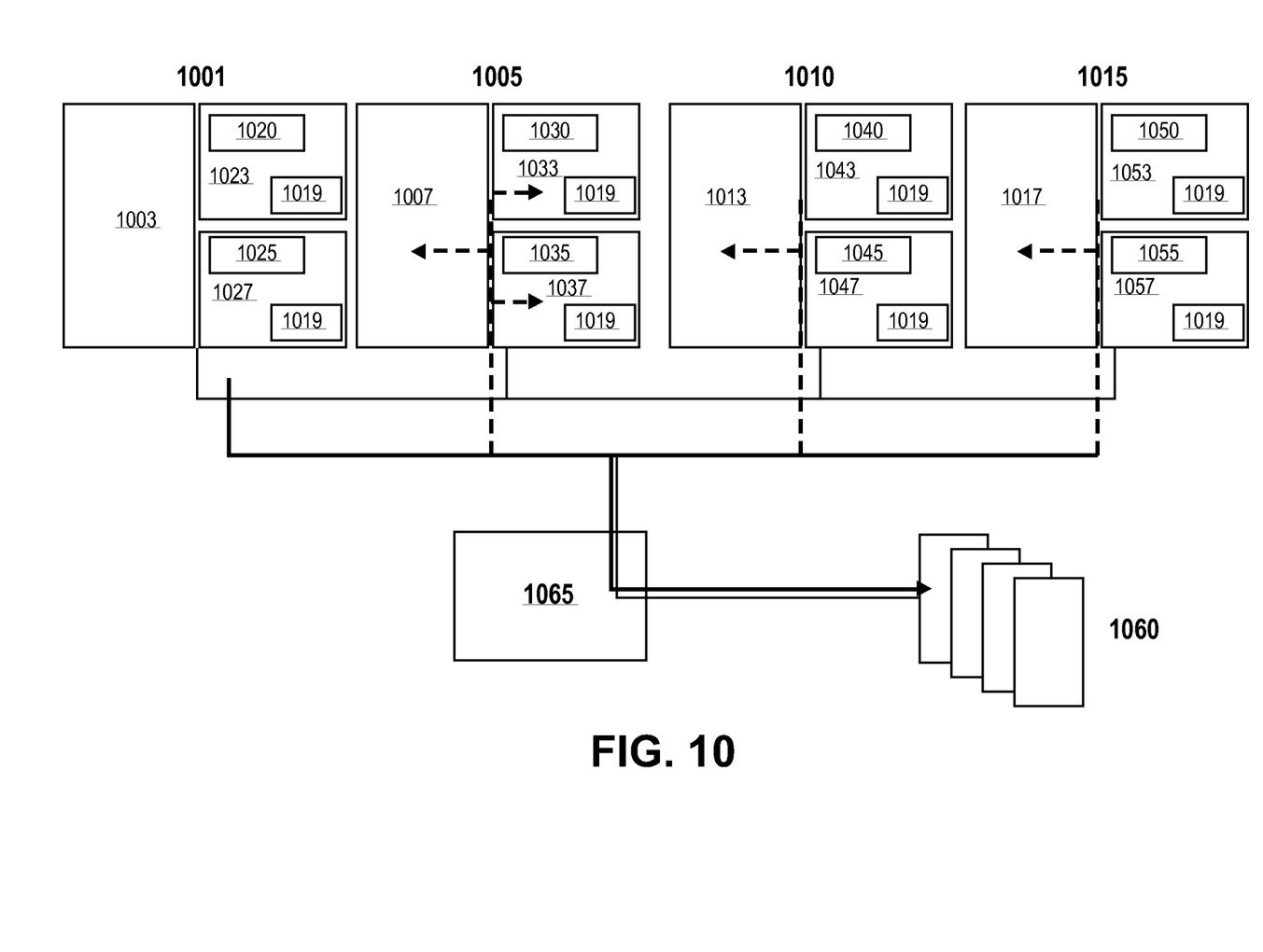
FIG. 10 illustrates a shared interconnect system, in which at least one embodiment may be used.

FIG. 10, for example, illustrates a shared-bus computer system (e.g., front-side-bus (FSB) computer system) in which one embodiment of the invention may be used. Any processor 1001, 1005, 1010, or 1015 may include asymmetric cores (differing in performance, power, operating voltage, clock speed, or ISA), which may access information from any local level one (L1) cache memory 1020, 1025, 1030, 235, 1040, 1045, 1050, 1055 within or otherwise associated with one of the processor cores 1023, 1027, 1033, 1037, 1043, 1047, 1053, 1057. Furthermore, any processor 1001, 1005, 1010, or 1015 may access information from any one of the shared level two (L2) caches 1003, 1007, 1013, 1017 or from system memory 1060 via chipset 1065.

Embodiments of the invention may exist in any of the processors or agents illustrated in FIG. 10. For example, logic 1019 may be incorporated within any or all processors 1023, 1027, 1033, 1037, 1043, 1047, 1053, 1057, to perform aspects of at least one embodiment. Particularly, logic 1019 may be used to detect, transmit, and interpret signals from other agents with in the system to determine whether to open or close a page of memory, depending on whether a page is currently being accessed by another agent. In other embodiments, the logic 1019 is distributed among multiple agents. Still in other embodiments, logic 1060 may include software, hardware, or some combination thereof.

In addition to the FSB computer system illustrated in FIG. 10, other system configurations may be used in conjunction with various embodiments of the invention, including point-to-point (P2P) interconnect systems and ring interconnect systems. The P2P system of FIG. 11, for example, may include several processors, of which only two, processors 1170, 1180 are shown by example. Processors 1170, 1180 may each include a local memory controller hub (MCH) 1172, 1182 to connect with memory 112, 114. Processors 1170, 1180 may exchange data via a point-to-point (PtP) interface 1150 using PtP interface circuits 1178, 1188. Processors 1170, 1180 may each exchange data with a chipset 1190 via individual PtP interfaces 1152, 1154 using point to point interface circuits 1176, 1194, 1186, 1198. Chipset 1190 may also exchange data with a high-performance graphics circuit 1138 via a high-performance graphics interface 1139.

Figure 11:
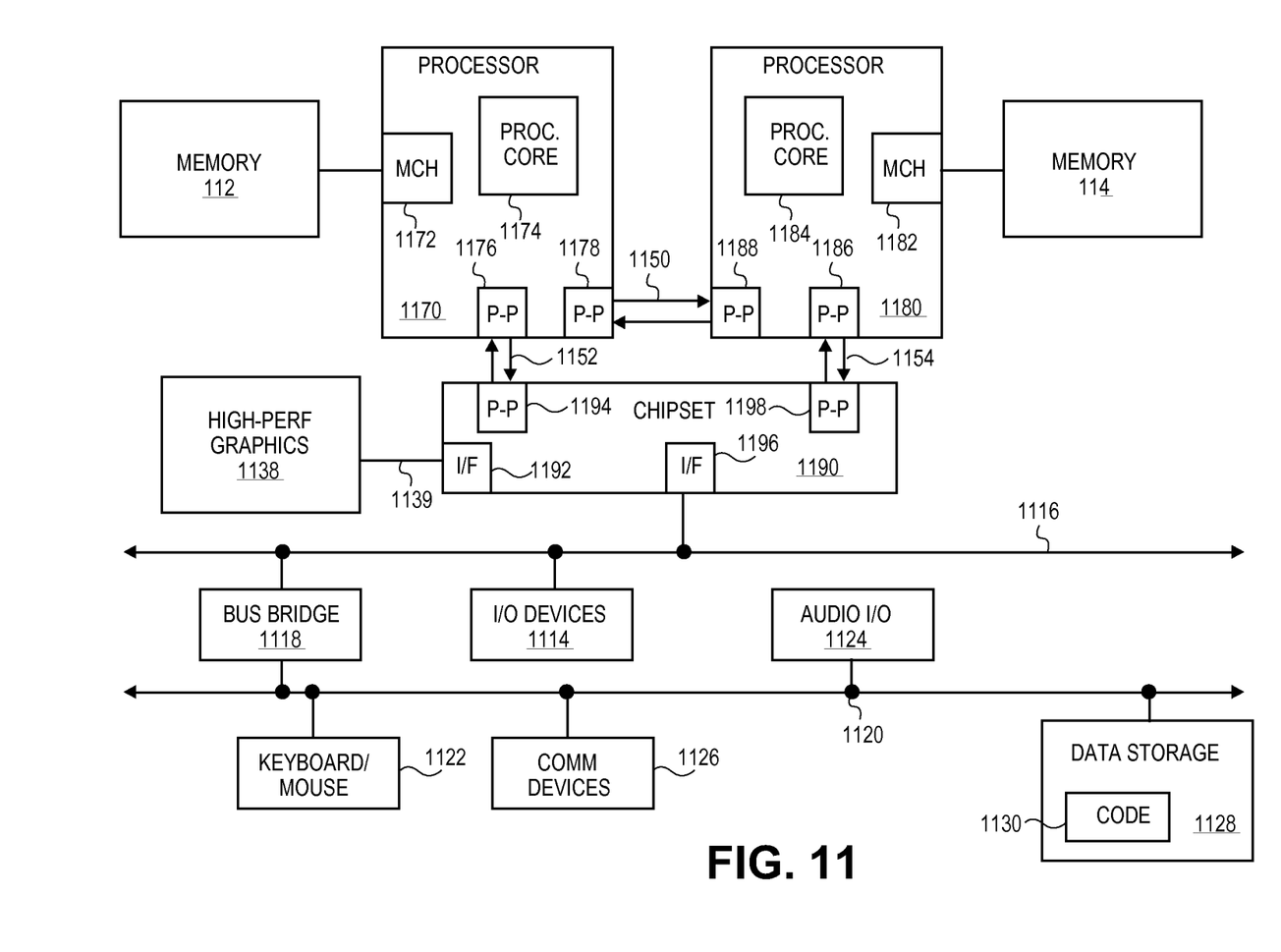
FIG. 11 illustrates a point-to-point interconnect computer system, in which at least one embodiment of the invention may be used.

Embodiments of the invention may be included in any processor or agent within FIG. 11. For example, logic 1199 may be incorporated within either or both processors 1170, 1180, to perform aspects of at least one embodiment. Particularly, logic 1199 may be used to detect, transmit, and interpret signals from other agents with in the system to determine whether to open or close a page of memory, depending on whether a page is currently being accessed by another agent. In other embodiments, the logic 1199 is distributed among multiple agents. Still in other embodiments, logic 1199 may include software, hardware, or some combination thereof.

Many different types of processing devices could benefit from the use of such process re-allocation techniques. For example, the processing units 600-1 through 600-N may be general purpose processors (e.g., microprocessors) or may be microprocessor cores for a multiple core (on a single die) microprocessor. Alternatively, digital signal processors, graphics processors, network processors, or any type of special purpose processor that may be used in a system with multiple parallel units or cores may benefit from thermally (or power) motivated process shifting between processing units. The processing units or processors may be identical or have at least partial functional overlap. That is, each processing unit has some common set of instructions or commands such that there are at least some (if not all) processes that can be executed on more than one processing unit or processor. In other embodiments, the processing units may be asymmetrical, in as much as they have any or a combination of different performance capabilities, number of transistors, power consumption or thermal characteristics, clock frequencies, or ISA.

In order to facilitate expedient processing and return of requested data, at least one embodiment may include a coherency filter to determine how best (e.g., fastest) way to retrieve data requested by an application. For example, in one embodiment, a coherency filter may include a coherency table whose entries include information about data currently accessible by any processor or processors in the system. In one embodiment, the coherency table for a processor includes a list of addresses indicating the data that may be available within a cache, buffer, or other storage structure of another processor in the system, such that when an application requests data, the processor may first check its coherency table to see if another processor currently has the data. If so, the data may be retrieved by the processor servicing the request by retrieving the data across the inter-processor n-wide interconnect. Because the table, in one embodiment, would only indicate some of the data that is available in either processor's cache/buffers/etc., (indeed, the table could vary in the amount of info contained therein), the traffic on the n-wide inter-processor interconnect could be reduced, or at least controlled, according to the information or size of the coherency table(s).

Figure 12:
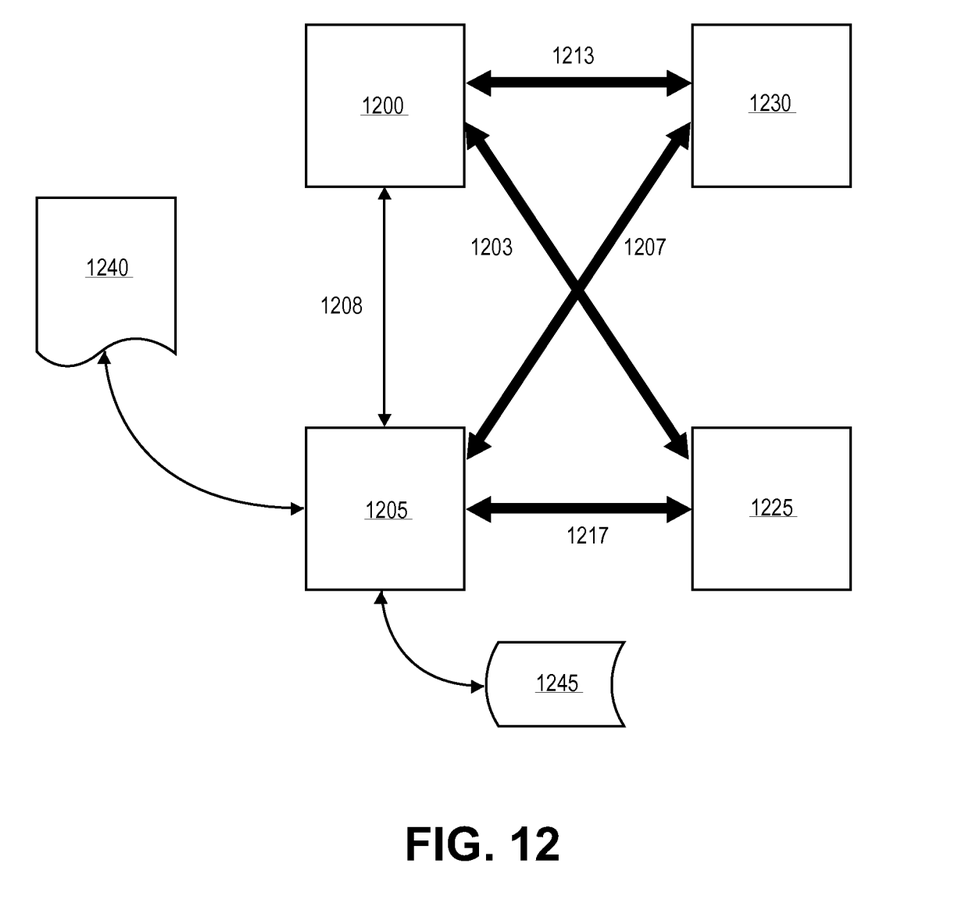
FIG. 12 illustrates a system in which one embodiment of the invention may be used, including a coherency filter.

FIG. 12 illustrates a system in which one embodiment of the invention may be used, including a coherency filter. In FIG. 12, an application or thread 1240 running on processor 1205 may request data by providing an address to processor 1205. Processor 1205 may then access a coherency table 1245, stored in the processor or some memory accessible by the processor, to determine whether the requested data is currently within a cache or buffer within processor 1200. If, for example, the table indicates that the requested data is currently available in processor 1200, the processor 1205 may retrieve the data from processor 1200 across interconnect 1208, thereby providing the data to the program in the most expedient manner possible. In one embodiment, the table is referenced with a portion of the address provided by application or thread 1240 to processor 1205. Furthermore, in at least one embodiment, a different table (or the same table) corresponds to each processor in the system and is maintained by creating an entry within the table for each requested address that is found in another processor. Furthermore, each entry may include information to indicate when the data is not found within another processor, or the entry may be removed altogether. Various coherency table maintenance schemes and algorithms may be used to keep track of information that is to be shared between the processors across the interconnect 1208.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
at least two processors coupled to at least two memories, wherein a first of the at least two processors is to read a first portion of a first data word stored in a first of the at least two memories and a second portion of a second data word stored in a second of the at least two memories within a first portion of a clock signal period, and wherein a second of the at least two processors is to read a third portion of the first data word stored in the first of the at least two memories and a fourth portion of the second data word stored in the second of the at least two memories within the first portion of the clock signal period.

2. The apparatus of claim 1, further comprising a first buffer coupled to the first memory to store the first and third portions of the first data word after the first and third portions of the first data word have been read from the first memory.

3. The apparatus of claim 2, further comprising a second buffer coupled to the second memory to store the second and fourth portions of the second data word after the second and fourth portions of the second data word have been read from the second memory.

4. The apparatus of claim 3, wherein the first processor is to read the first portion of the first data word from a first portion of the first buffer and the third portion of the second data word from a third portion of the second buffer.

5. The apparatus of claim 4, wherein the second processor is to read the second portion of the first data word from a second portion of the first buffer and the fourth portion of the second data word from a fourth portion of the second buffer.

6. The apparatus of claim 1, further comprising an interconnect coupled to the at least first and second processors to communicate page state information corresponding to the at least first and second memories.

7. The apparatus of claim 1, wherein the first, second, third, and fourth portions of the first and second data words each have the same bit width.

8. The apparatus of claim 1, wherein the at least first and second processors are to perform three-dimensional (3D) graphics operations.

9. The apparatus of claim 1, wherein the first portion of the first clock period is a half of the first clock period.

10. The apparatus of claim 1, wherein the first portion of the first clock period is one clock period.

11. A processor comprising:
a first hardware logic to provide page state information to a second processor, wherein the page state information includes whether a first page of a first memory is to be closed, wherein the first hardware logic is to prevent the first page from being closed if the second processor indicates that the second processor is to access information from the first page.

12. The processor of claim 11, further comprising execution logic to perform single-instruction-multiple-data (SIMD) instructions.

13. The processor of claim 11, wherein the page state information is to be communicated via dedicated interconnect between the first and second processor.

14. The processor of claim 11, further comprising a second logic to receive page state information from the second processor, wherein the page state information includes whether a second page of a second memory is to be closed, wherein the second processor is to prevent the second page from being closed if the processor is to access information from the second page.

15. The processor of claim 14, wherein the processor and the second processor are to each access information from the first and second memories in parallel.

16. The processor of claim 14, further comprising a third logic to cause a third page to be opened within the first memory if either the processor or the second processor is to access information in the third page.

17. The processor of claim 11, further comprising three-dimensional (3D) graphics rendering logic.

18. The processor of claim 17, wherein, the second processor includes 3D graphics rendering logic.

19. A system comprising:
a plurality of processors coupled to a plurality of memories, wherein each of the plurality of processors are to access each of the plurality of memories in parallel;
a plurality of interconnects coupled to the plurality of processors to communicate page state information among the plurality of processors.

20. The system of claim 19, further comprising a plurality of memory controllers coupled to each of the plurality of processors.

21. The system of claim 20, wherein the plurality of memory controllers are to route accesses from each of the plurality of processors to the plurality of memories.

22. The system of claim 19, wherein each processor is to access a X/N-bit wide data word from each of the plurality of memories, where "N" corresponds to the number of the plurality of processors and "X/N" is an integer value.

23. The system of claim 22, wherein each of the plurality of memories is coupled to a buffer to store data to be accessed by the plurality of processors in parallel.

24. The system of claim 23, wherein each buffer is to store 16 bits concurrently.

25. A method comprising:
opening a plurality of pages of memory, each page being within a different memory;
accessing data from each of the plurality of pages of memory and providing the data to a plurality of processors in parallel;
requesting to close at least one of the plurality of pages of memory, wherein the requesting is from one of the plurality of processors, which does not control the at least one page of memory, to another of the plurality of processors, which does control the at least one page of memory;
granting the request to close the at least one page of the plurality of pages of memory if no other processor of the plurality of processors is accessing it.

26. The method of claim 25, further comprising communicating an indication of the request to the plurality of processors.

27. The method of claim 26, wherein the indication is communicated to the plurality of processors via a plurality of dedicated interconnects coupled to the plurality of processors.

28. The method of claim 27, wherein the plurality of processors includes a plurality of memory controllers to access the data from the plurality of memories.

29. The method of claim 27, wherein the plurality of memories include a plurality of buffers to store the data temporarily until it is accessed by the plurality of processors.

30. The method of claim 25, wherein the plurality of processors are graphics processors.

* * * * *